US012375245B2

(12) United States Patent
Jiang et al.

(10) Patent No.: US 12,375,245 B2
(45) Date of Patent: Jul. 29, 2025

(54) MULTIPLE TRANSMISSION RECEPTION POINT SIGNALING

(71) Applicant: ZTE CORPORATION, Guangdong (CN)

(72) Inventors: Chuangxin Jiang, Shenzhen (CN); Yang Zhang, Shenzhen (CN); Meng Mei, Shenzhen (CN); Zhaohua Lu, Shenzhen (CN); Hao Wu, Shenzhen (CN); Bo Gao, Shenzhen (CN); Shujuan Zhang, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 434 days.

(21) Appl. No.: 17/948,320

(22) Filed: Sep. 20, 2022

(65) Prior Publication Data

US 2023/0012515 A1 Jan. 19, 2023

Related U.S. Application Data

(63) Continuation of application No. PCT/CN2020/135678, filed on Dec. 11, 2020.

(51) Int. Cl.
*H04L 5/00* (2006.01)
*H04W 72/23* (2023.01)

(52) U.S. Cl.
CPC .......... *H04L 5/0051* (2013.01); *H04W 72/23* (2023.01); *H04L 5/0035* (2013.01)

(58) Field of Classification Search
CPC ............................ H04L 5/0051; H04W 72/23
See application file for complete search history.

(56) References Cited

U.S. PATENT DOCUMENTS

| | | | | |
|---|---|---|---|---|
| 2021/0337534 | A1* | 10/2021 | Xiong | H04L 1/08 |
| 2022/0022223 | A1* | 1/2022 | Yang | H04L 5/0048 |
| 2022/0116979 | A1* | 4/2022 | Park | H04B 7/0628 |
| 2022/0369235 | A1* | 11/2022 | Chen | H04W 52/146 |

FOREIGN PATENT DOCUMENTS

| | | | |
|---|---|---|---|
| WO | WO-2020/024176 | A1 | 2/2020 |
| WO | WO-2020/077536 | A1 | 4/2020 |
| WO | WO-2020/164394 | A1 | 8/2020 |

OTHER PUBLICATIONS

Extended European Search Report for EP Appl. No. 20964730.4, dated Jan. 22, 2024 (8 pages).

(Continued)

*Primary Examiner* — Ronald B Abelson
(74) *Attorney, Agent, or Firm* — Foley & Lardner LLP

(57) ABSTRACT

Presented are systems, methods, apparatuses, or computer-readable media for multiple transmit reception point (TRP) transmission signaling. A wireless communication node may transmit, to a wireless communication device, a scheduling grant to schedule a plurality of transmission instances. The scheduling grant may include one or more transmission precoding matrix indicators (TPMIs) to indicate mappings between the plurality of transmission instances and a plurality of sounding reference signal (SRS) resource sets for uplink codebook based transmissions.

18 Claims, 7 Drawing Sheets

(56) References Cited

OTHER PUBLICATIONS

AD-HOC Chair (Samsung), "Session notes for 8.1 (Further enhancements on MIMO for NR)" 3GPP TSG RAN WG1 Meeting #103-e, R1-2009832, Oct. 26, 2020, e-Meeting (17 pages).
CATT, "Discussion on enhancements on multi-TRP/panel for PDCCH, PUCCH and PUSCH" 3GPP TSG RAN WG1 Meeting #103-e, R1-2007825. Oct. 26, 2020, e-Meeting (15 pages).
Ericsson, "On PDCCH, PUCCH and PUSCH enhancements with multiple TRPs" 3GPP TSG-RAN WG1 Meeting #103, R1-2009223, Oct. 26, 2020, e-Meeting (28 pages).
Fraunhofer IIS et al., "On multi-TRP enhancements for PDCCH and PUSCH" 3GPP TSG RAN WG1 Meeting #103-e, R1-2008898, Nov. 2, 2020, e-Meeting (9 pages).
Huawei et al., "Enhancements on multi-TRP for reliability and robustness in Rel-17" 3GPP TSG RAN WG1 Meeting #103-e, R1-2007587, Oct. 26, 2020, e-Meeting (12 pages).
International Search Report and Written Opinion for PCT Appl. No. PCT/CN2020/135678, mailed Sep. 10, 2021 (7 pages).
Moderator Nokia et al., "Summary of Multi-TRP URLLC for PUCCH and PUSCH" 3GPP TSG RAN WG1 #103, R1-2009480, Oct. 26, 2020, e-Meeting (80 pages).
NTT Docomo, Inc., "Discussion on MTRP for reliability" 3GPP TSG RAN WG1 #103-e, R1-2009175, Oct. 26, 2020, e-Meeting (11 pages).
Qualcomm Inc., "Enhancements on Multi-TRP for PDCCH, PUCCH and PUSCH" 3GPP TSG-RAN WG1 Meeting #103-e, R1-2009251, Oct. 26, 2020, e-Meeting (33 pages).
Qualcomm Incorporated, "Discussion on NR Rel-16 UE features" 3GPP TSG RAN WG1 #103-e, R1-2008631, Oct. 26, 2020, e-Meeting (102 pages).
Samsung, "Enhancements on Multi-TRP for PDCCH, PUCCH and PUSCH" 3GPP TSG RAN WG1 #103-e, R1-2008149, Oct. 26, 2020, e-Meeting (11 pages).
Samsung, "Further Enhancements on MIMO for NR" 3GPP TSG RAN Meeting #90-e, RP-202299, Dec. 7, 2020, e-Meeting (15 pages).
Spreadtrum Communications, "Discussion on enhancements on Multi-TRP for PDCCH, PUCCH and PUSCH" 3GPP TSG RAN WG1 #103-e, R1-2009142, Oct. 26, 2020, e-Meeting (13 pages).
Vivo, "Further discussion on enhancement of MTRP operation" 3GPP TSG RAN WG1 #103-e, R1-2007645, Oct. 26, 2020, e-Meeting (15 pages).
VIVO: "Further discussion on enhancement of MTRP operation" 3GPP TSG RAN WG1 #103-e; R1-2007645; Nov. 13, 2020; e-Meeting (15 pages).
Xiaomi, "Enhancements on Multi-TRP for PDCCH, PUCCH and PUSCH" 3GPP TSG RAN WG1 #103-e, R1-2009028, Oct. 26, 2020, e-Meeting (18 pages).
ZTE, "Multi-TRP enhancements for PDCCH, PUCCH and PUSCH" 3GPP TSG RAN WG1 Meeting #103-e, R1-2007764, Oct. 26, 2020, e-Meeting (22 pages).
ZTE: "Further details on Multi-beam and Multi-TRP operation" 3GPP TSG RAN WG1 Meeting #103-e; R1-2007770; Nov. 13, 2020; e-Meeting (14 pages).

* cited by examiner

One PUSCH occasion

MULTIPLE TRANSMISSION RECEPTION POINT SIGNALING

CROSS-REFERENCE TO RELATED APPLICATION

This application claims the benefit of priority under 35 U.S.C. § 120 as a continuation of PCT Patent Application No. PCT/CN2020/135678, filed on Dec. 11, 2020, the disclosure of which is incorporated herein by reference in its entirety.

TECHNICAL FIELD

The disclosure relates generally to wireless communications, including but not limited to systems and methods for multiple transmission reception point (TRP) transmission/reception signaling.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication node may transmit, to a wireless communication device, a scheduling grant to schedule a plurality of transmission instances. The scheduling grant may include one or more transmission precoding matrix indicators (TPMIs) to provide precoder information for the plurality of transmission instances and also to indicate mappings between the plurality of transmission instances and a plurality of sounding reference signal (SRS) resource sets for uplink codebook based transmissions.

In some embodiments, the one or more TPMIs may include a first TPMI and a second TPMI, and the plurality of SRS resource sets includes a first SRS resource set and a second SRS resource set. In some embodiments, at least a first value of the first TPMI may indicate that the plurality of transmission instances is mapped to at least one of: one SRS resource of the second SRS resource set, at least a portion of a second set of power control parameters, or the second set of power control parameters, or a second configuration of codebook subset. The precoder information of the plurality of transmission instances may be provided by the second TPMI. In some embodiments, at least a second value of the second TPMI may indicate that the plurality of transmission instances is mapped to at least one of: one SRS resource of the first SRS resource set, at least a portion of a first set of power control parameters, the first set of power control parameters, or a first configuration of codebook subset. The precoder information of the plurality of transmission instances may be provided by the first TPMI.

In some embodiments, at least a third value, other than the at least the first value and the at least the second value, may indicate that a first subset and a second subset of the plurality of transmission instances are respectively mapped to one SRS resource of the first SRS resource set and one SRS resource of the second SRS resource set, or respectively mapped to at least a portion of the first set of power control parameters and at least a portion of the second set of power control parameters, or respectively mapped to the first set of power control parameters and the second set of power control parameters, or respectively mapped to the first configuration of codebook subset and the second configuration of codebook subset. The precoder information of the first subset of the plurality of transmission instances may be provided by a third value in the first TPMI, and the precoder information of the second subset of the plurality of transmission instances may be provided by a third value in the second TPMI. In some embodiments, a third value in the first TPMI and a third value in the second TPMI may be the same or different.

In some embodiments, the at least the first value may be a last or largest value of the first TPMI. In some embodiments, the at least the second value may be a last or largest value of the second TPMI. In some embodiments, the one or more TPMIs may include a first TPMI and a second TPMI, and the plurality of SRS resource sets may include a first SRS resource set and a second SRS resource set. In some embodiments, the second TPMI may at least indicate a mapping between the plurality of transmission instances and at least one of: the first SRS resource set or the second SRS resource set.

In some embodiments, a first value of the second TPMI may indicate that the plurality of transmission instances is mapped to at least one of: one SRS resource of the first SRS resource set, at least a portion of a first set of power control parameters, or the first set of power control parameters, or a first configuration of codebook subset. In some embodiments, a second value of the second TPMI may indicate that the plurality of transmission instances is mapped to at least one of: one SRS resource of the second SRS resource set, at least a portion of a second set of power control parameters, or the second set of power control parameters, or a second configuration of codebook subset.

In some embodiments, the first TPMI may indicate a number of layers and precoder information of the plurality of transmission instances. In some embodiments, the first value of the second TPMI may be a next to last or next to largest value of the second TPMI, and the second value of the second TPMI may be a last or largest value of the second TPMI. In some embodiments, the first value of the second TPMI may be a last or largest value of the second TPMI, and the second value of the second TPMI may be a next last or next to largest value of the second TPMI.

In some embodiments, at least a third value of the second TPMI, other than the at least the first value and the at least the second value of the second TPMI, may indicate that a first subset and a second subset of the plurality of transmission instances are respectively mapped to one SRS resource of the first SRS resource set and one SRS resource of the second SRS resource set, or respectively mapped to at least a portion of the first set and at least a portion of the second set of power control parameters, or respectively mapped to the first set and the second set of power control parameters, or respectively mapped to the first configuration of codebook subset and the second configuration of codebook subset. The precoder information provided by the first TPMI and the second TPMI may be respectively used for the first subset and the second subset of the plurality of transmission instances.

In some embodiments, the one SRS resource of the first SRS resource set or the at least a portion of the first set of power control parameters is indicated by a first SRS resource indicator (SRI) in the scheduling grant. In some embodiments, the one SRS resource of the second SRS resource set or the at least a portion of the second set of power control parameters may be indicated by a second SRI in the scheduling grant. In some embodiments, each of the plurality of transmission instances may comprise one transmission occasion or one frequency hop. In some embodiments, one scheduling grant may comprise at least one of downlink control information (DCI), a physical downlink control channel (PDCCH), or configured grant.

At least one aspect is directed to a system, a method, an apparatus, or a computer-readable medium. A wireless communication device may receive, from a wireless communication node, a scheduling grant to schedule a plurality of transmission instances. The scheduling grant may include one or more transmission precoding matrix indicators (TPMIs) to indicate mappings between the plurality of transmission instances and a plurality of sounding reference signal (SRS) resource sets for uplink codebook based transmissions.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
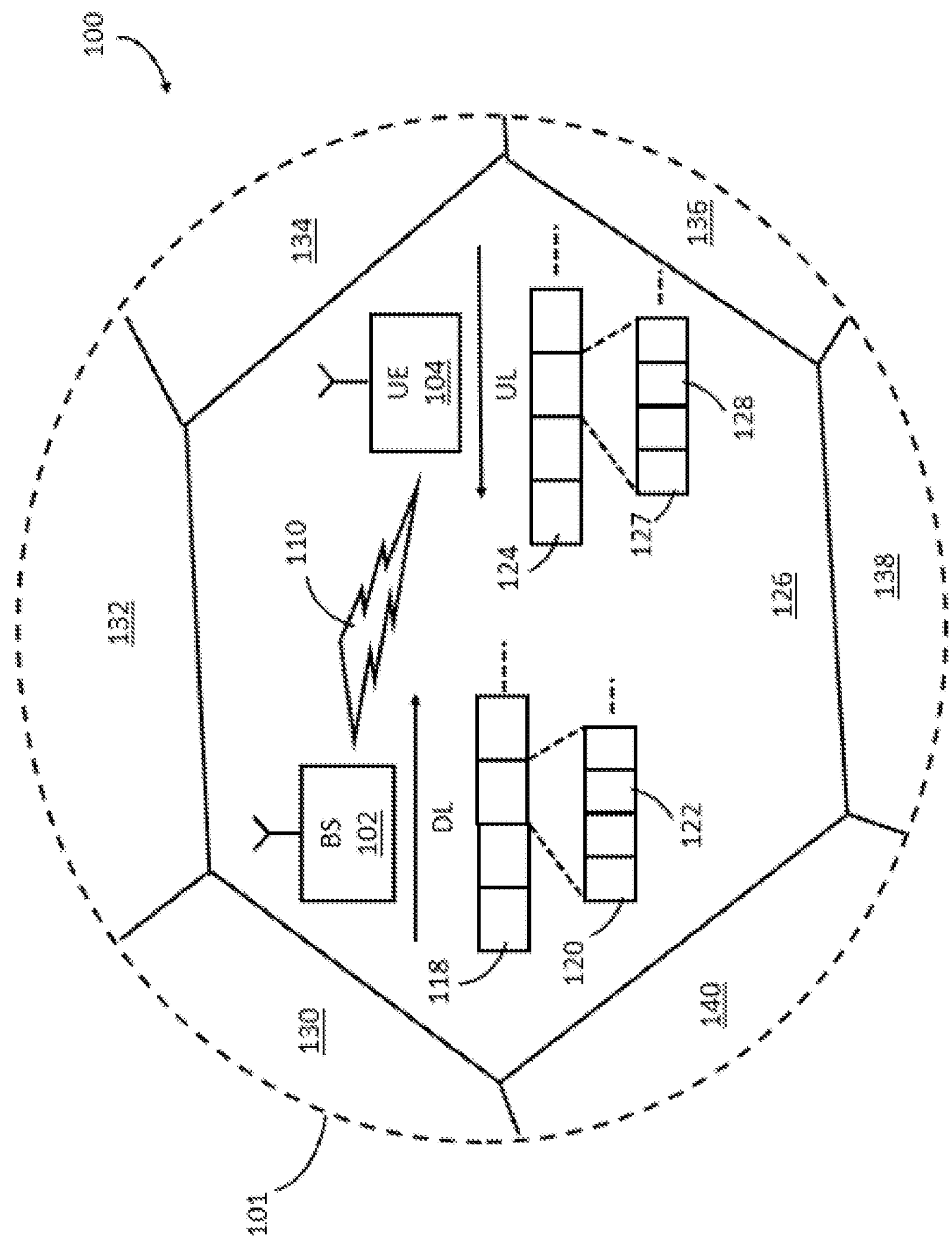
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
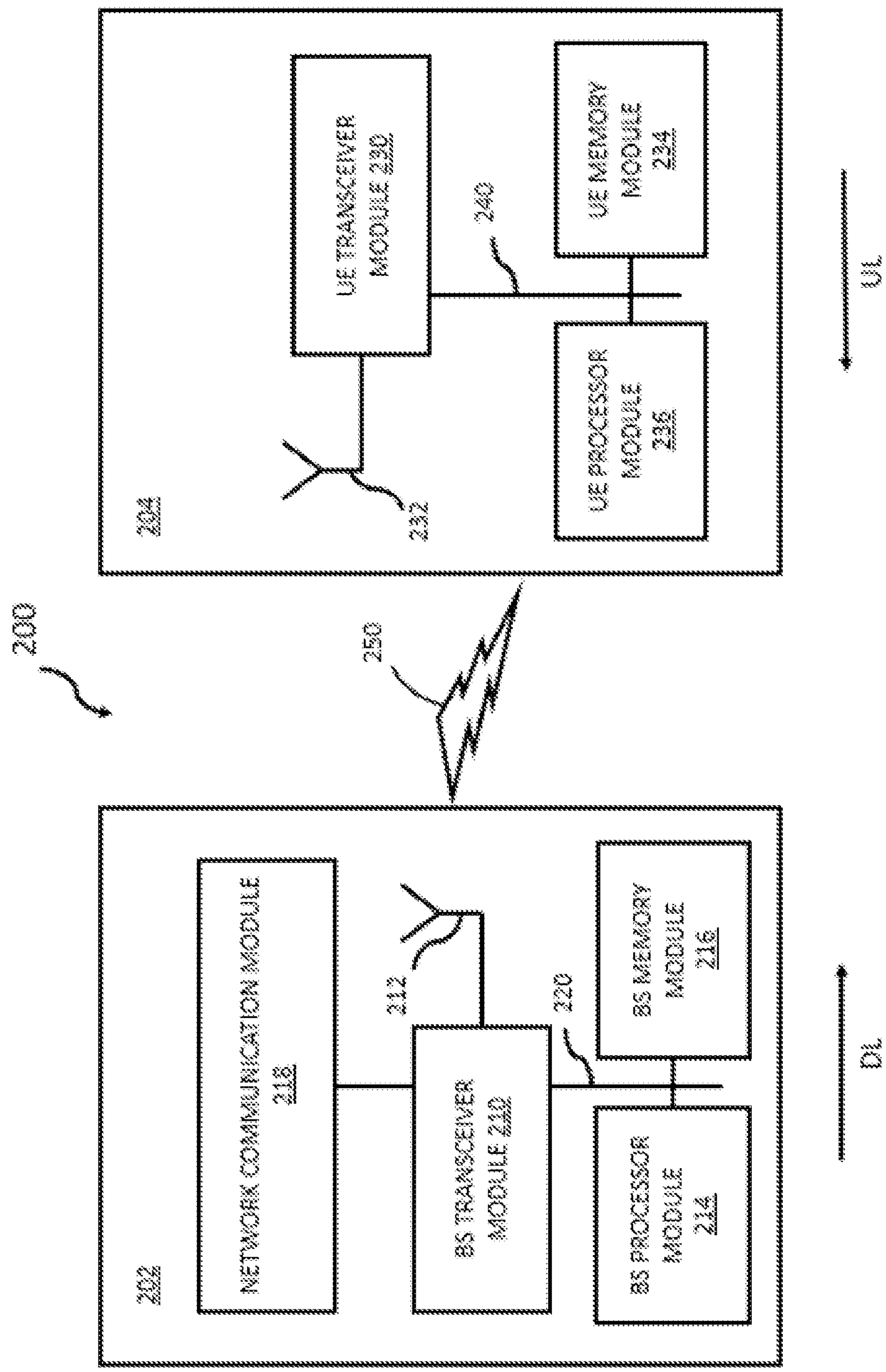
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Multiple Transmission Reception Point (TRP) Transmitting Signaling To support multi-TRP physical uplink shared channel (PUSCH) transmission scheduled by a single a scheduling grant (e.g., in a downlink control information (DCI) or a configured grant), multiple sounding reference signals (SRS) resource sets may be introduced for channel state information (CSI) measurement. Furthermore, multiple SRS resource indicator (SRI) and transmission precoding matrix indicator (TPMI) fields may be introduced in a DCI. However, supporting dynamic switching between a single TRP and multi-TRP PUSCH transmission and minimizing DCI overhead may be a serious challenge.

In order to support dynamic switching between single TRP and multi-TRP PUSCH transmission and minimize the DCI overhead, the TPMI may be used to provide procoder information for the plurality of transmission instances and to indicate the mapping between PUSCH occasions scheduled by the DCI and the configured SRS resource sets for codebook. Specifically, the first set of dedicated entries in TPMI1 may be used to indicate all scheduling PUSCH occasions (e.g., transmission occasions for scheduling PUSCH transmission) corresponding to SRS resource set 0 (single TRP transmission towards to TRP0). In addition, the second set of dedicated entries in TPMI1 can be used to indicate all scheduling PUSCH occasions corresponding to SRS resource set 1 (single TRP transmission towards to TRP1). The number of layers and precoders information of all PUSCH occasions are indicated by TPMI0. Furthermore, the third set of entries in TPMI1 can be used to indicate MTRP transmission. The first set of PUSCH occasions may correspond to SRS resource set 0, and the second set of PUSCH occasions may correspond to SRS resource set 1. The number of layers of all PUSCH occasions is indicated by TPMI0. The precoder information of the first set and the second set of PUSCH occasions may be indicated by TPMI0 and TPMI1 respectively. The first SRS resource set may correspond to a first set of power control parameters. The second SRS resource set may correspond to a second set of power control parameters. Further, the first SRS resource set may correspond to a first configuration of codebook subset. The second SRS resource set may correspond to a second configuration of codebook subset.

A. Environment for Multiple Transmission Reception Point (TRP) Signaling

Uplink (UL) data may be carried by PUSCH in physical layer. The UL channel condition measurement may be based on SRS transmission. Under some approaches, a procedure may be as follows. First, a gNB may configure one SRS resource set for UL CSI measurement. At most two SRS resources can be configured in the SRS resource set. Since this SRS resource set is configured for CSI measurement for PUSCH, the usage of this SRS resource set may be 'codebook' or 'nonCodebook'. Second, the UE may transmit the SRS resource(s) of the SRS resource set. Third, the gNB may measure the SRS resource(s). For codebook based PUSCH transmission, the gNB may transmit a scheduling grant. The scheduling grant may be a DCI or a configured grant signaling to trigger a PUSCH transmission. The scheduling information may be carried in the scheduling grant. The grant may include precoding information, a number of layers, and SRS resource indicator, among others. Next, the UE may transmit PUSCH based on the scheduling information carried by the scheduling grant. The spatial relation information of the PUSCH may be based on the SRS resource indicated by the SRS resource indicator. If only one SRS resource is configured in the SRS resource set for codebook, SRS resource indicator may not be used.

For codebook based transmission, PUSCH can be scheduled by DCI format 0_0, DCI format 0_1, DCI format 0_2 or semi-statically configured to operate (configured grant PUSCH scheduling). If this PUSCH is scheduled by DCI format 0_1, DCI format 0_2, or semi-statically configured to operate, the UE may determine its PUSCH transmission precoder based on SRI, TPMI and the transmission rank. The SRI, TPMI, and the transmission rank may be given by DCI fields of SRS resource indicator, the precoding information, and the number of layers for DCI format 0_1 and 0_2. The SRI, TPMI, and the transmission rank may also be given by srs-ResourceIndicator and precodingAndNumberOfLayers. The SRS-ResourceSet(s) applicable for PUSCH scheduled by DCI format 0_1 and DCI format 0_2 may be defined by the entries of the higher layer parameter srs-ResourceSetToAddModList and srs-ResourceSetToAddModListForDCI-Format0-2-r16 in SRS-config, respectively.

The TPMI may be used to indicate the precoder to be applied over the layers $\{0 \ldots v-1\}$ and that corresponds to the SRS resource selected by the SRI when multiple SRS resources are configured. If a single SRS resource is configured, the TPMI may be used to indicate the precoder to be applied over the layers {0 . . . v−1} and that corresponds to the SRS resource. The transmission precoder may be selected from the uplink codebook that has a number of antenna ports equal to higher layer parameter nrofSRS-Ports in SRS-Config. The indicated SRI in slot n may be associated with the most recent transmission of SRS resource identified by the SRI. The SRS resource may be located/scheduled prior to the PDCCH carrying the SRI.

Figure 3:
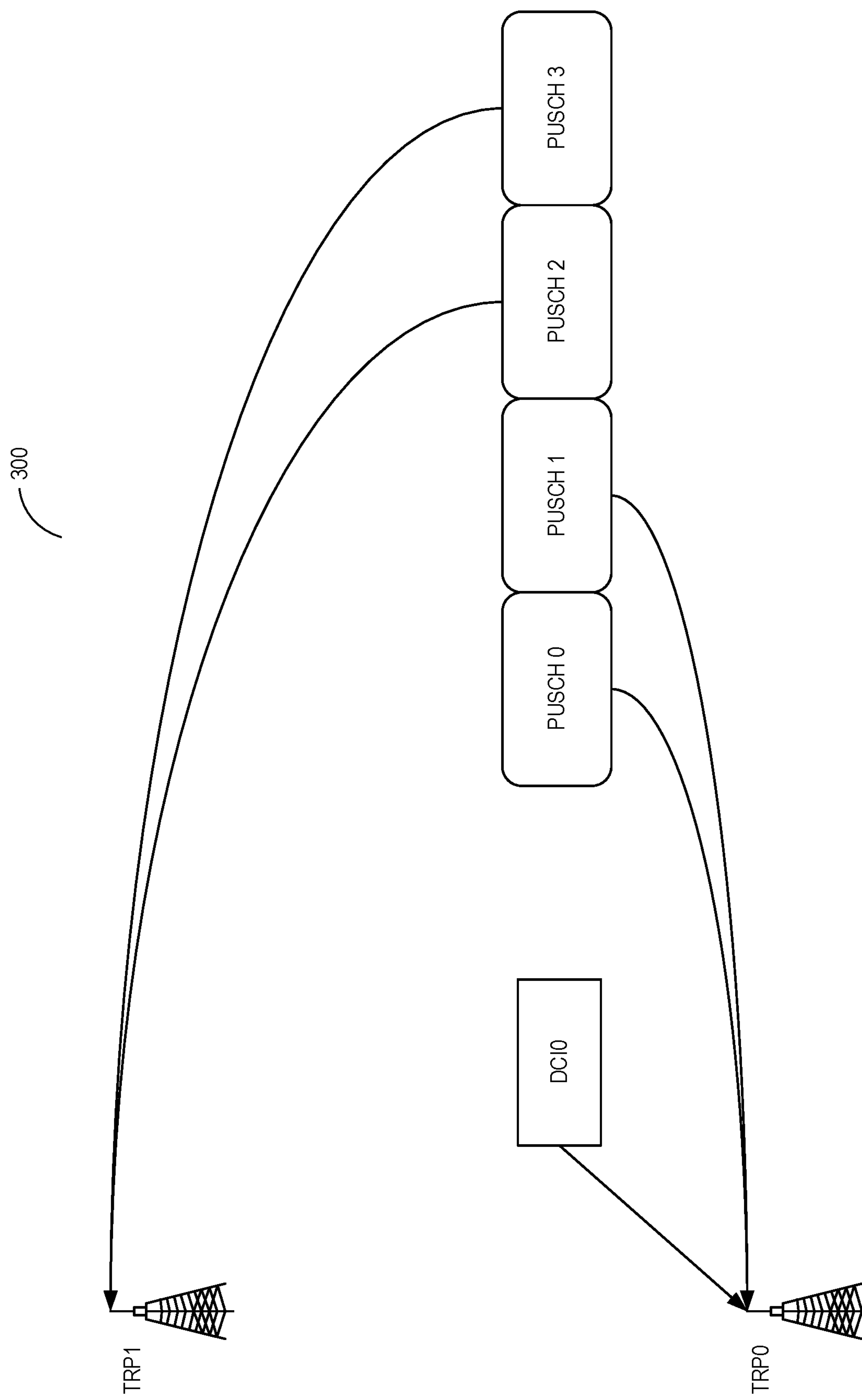
FIG. 3 illustrates a block diagram of a system for a single downlink control information (DCI) based multiple transmission reception points (TRP) transmission using time division multiplexing (TDM) scheme in accordance with an illustrative embodiment.

Referring now to FIG. 3, depicted is a block diagram of a system 300 for a single downlink control information (DCI) based multiple transmission reception points (TRP) transmission using time division multiplexing (TDM) scheme. As shown, a single DCI based MTRP (multiple transmission reception points) transmission may be introduced where one DCI is used to schedule PDSCH(s) from two TRPs or schedule PUSCH(s) directed to two TRPs. The single DCI can be either transmitted from TRP0 or TRP1 or both TRPs. The UE may transmit multiple time division multiplexed (TDMed) PUSCHs to two TRPs. The multiple PUSCHs can carry the same data block. In other words, these PUSCHs may be in or correspond to repetition occasions. The transmission scheme may be called a TDMed scheme.

However, for PUSCH transmissions towards to multi-TRPs, some issues may be still unclear, including: how to support dynamic switching between single-TRP transmissions and multi-TRP transmissions, how to support SRS resource indicator for two TRPs, and how to support two TPMs for two TRPs, among other challenges.

B. Separate Sounding Reference Signals (SRS) and Transmit Precoding Matrix Indicator (TPMI)

Figure 4:
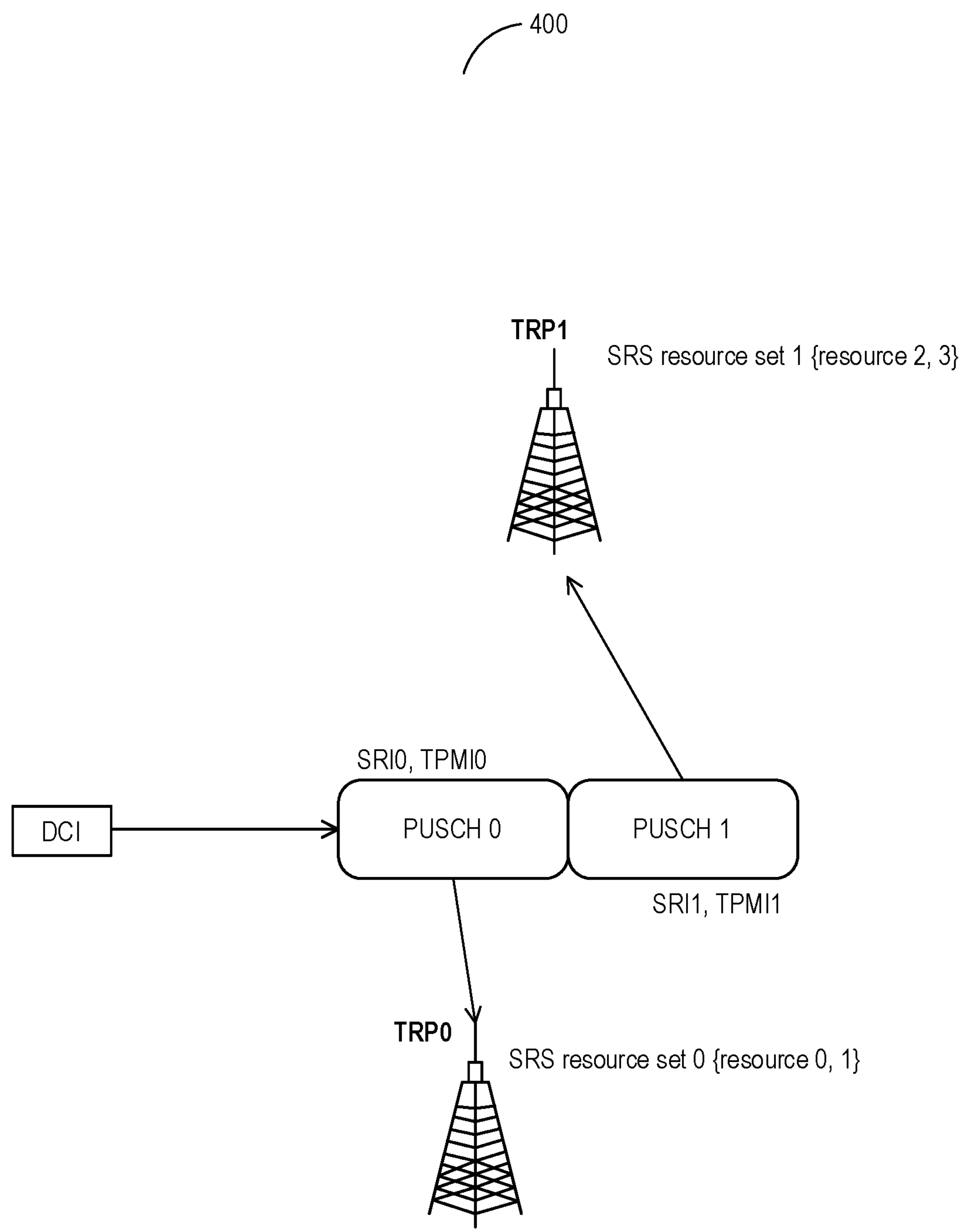
FIG. 4 illustrates a block diagram of a system for transmitting uplink communications using separate sounding reference signal resource indicators (SRIs) and transmit precoding matrix indices (TPMIs) in accordance with an illustrative embodiment.

Referring now to FIG. 4, depicted is a block diagram of a system 400 for transmitting uplink communications using separate sounding reference signal resource indicators (SRIs) and transmit precoding matrix indices (TPMIs). For scheduling PUSCH transmissions towards multiple TRPs (MTRP), one enhancement can be to support multiple SRS resource sets. Each SRS resource set may correspond to one TRP. Another enhancement can be to introduce multiple SRIs (SRS resource indicators) and multiple TPMI. Each SRI may be used to select one SRS resource from the corresponding SRS resource set for a TRP. Furthermore, each TPMI may be used to inform/provide precoder information and/or number of layers of PUSCH for each TRP. For instance, for a two-TRP case, two SRS resource sets can be configured for two TRPs respectively. In each SRS resource set, at most M SRS resources can be configured. If there is no enhancement, M=2. Thus, a 1-bit SRI may be sufficient for each TRP. As such, two SRI fields and two TPMI fields can be included in a DCI as shown in Table 1-1. If two SRS resources are configured for each SRS resource set, 1 bit for SRI0 and 1 bit for SRI1 may be used accordingly. If one SRS resource is configured for each SRS resource set, SRI0 or SRI1 may not be needed since two SRS resource sets can correspond to two TRP and two TPMI fields in a default order or manner. The DCI overhead can thus be avoided/reduced/saved. In other words, TPMI0 may be used to inform UE precoder information for TRP0, and TPMI1 may be used to inform UE precoder information for TRP1.

TABLE 1-1

Illustration of DCI fields to support PUSCHs for two TRPs

| | |
|---|---|
| SRI0<br>TPMI0 | For TRP0 |
| SRI1<br>TPMI1 | For TRP1 |

However, MTRP transmission may not always be the best transmission scheme since MTRP transmission relies on coordination of two TRPs and may cause double the resource occupation as compared with single-TRP transmission. At some times, gNB may schedule single-TRP PUSCH transmissions even though two SRS resource sets, two SRI fields, two TPMI fields are configured. That is, dynamic switching between single-TRP and MTRP PUSCH transmissions can occur and should be supported.

Taking the two SRS resources within each SRS resource set for codebook based PUSCH as an example, a 1-bit SRI0 may be used to select one of SRS resource 0 and SRS resource 1 within SRS resource set 0. Furthermore, a 1-bit SRI1 may be used to select one of SRS resource 2 and SRS resource 3 within SRS resource set 1. In such a case, if gNB is to schedule two PUSCH occasions towards to the same TRP (PUSCH0 and PUSCH1 correspond to the same SRS resource or resource set), more DCI overhead may be involved to dynamically switch the following three cases:

Under case 1, SRS resource set 0 for TRP0 may be enabled, and SRS resource set 1 for TRP1 may be disabled. This may be a single-TRP PUSCH transmission, and all PUSCH occasions may correspond to SRS resource(s) indicated by SRI0. TPMI0 may be used to inform/indicate/provide precoder information and number of layers for TRP0. TPMI1 may not be used.

Under case 2, the SRS resource set 0 for TRP0 may be disabled, and SRS resource set 1 for TRP1 may be enabled. This may be a single-TRP PUSCH transmission, and all PUSCH occasions may correspond to SRS resource(s) indicated by SRI1. TPMI1 may be used to inform/indicate/provide precoder information and number of layers for TRP1. TPMI0 is not used.

Under case 3, both SRS resource set 0 for TRP0 and SRS resource set 1 for TRP1 may be enabled. This may correspond/refer to MTRP PUSCH transmissions. All PUSCH occasions may be divided into two PUSCH occasion sets corresponding to two SRS resource sets respectively. TPMI0 may be used to inform/indicate/provide precoder information or number of layers for TRP0. TPMI1 may be used to inform/indicate/provide precoder information or number of layers for TRP1. If the number of layers of PUSCH occasions for two TRPs should be the same by default, then the number of layers may only be informed by using TPMI0 or TPMI1, for saving/reducing/avoiding DCI overhead.

In addressing these challenges, one approach may be to indicate the mapping between PUSCH occasions and SRS resource sets used for codebook based on one or more TPMIs. To support separate power control for PUSCH occasions towards different TRPs, multiple sets of power control parameters may be configured or predefined. Each set may correspond to a TRP or one SRS resource set for codebook. One set of power control parameters can be further split into multiple subsets of power control parameters. Each subset may correspond to one SRI or one SRS resource within the corresponding SRS resource set. Each subset of power control parameters can include one or more of p0, path-loss reference RS, pathloss compensation factor alpha, and close loop index, among others. As such, the TPMI may be used to indicate the mapping between PUSCH occasions and SRS resource sets for codebook. The TPMI may also be used to indicate the mapping between PUSCH occasions and multiple sets of power control parameters, if the number of sets of power control parameters equals to the number of SRS resource sets. Also, separate configurations of codebook subset for two TRPs can be configured, with two configurations of codebook subset corresponding to two SRS resource sets respectively. Thus, The TPMI may also be used to indicate the mapping between PUSCH occasions and multiple configurations of codebook subset. In short, one or more TPMI may be used to indicate the mapping among a plurality of transmission instances, multiple SRS resource sets, multiple set of power control parameters, or multiple configurations of codebook subset, among others.

I. Using Codebook for TRP Scheduling

For single TRP scheduling, as a UE may be configured full coherent codebook (codebookSubset= fullyAndPartialAndNonCoherent), the legacy TPMI may use 6 bits to indicate precoder information and number of layers as shown in Table 1-2. To support MTRP, two TPMIs may be supported in a scheduling grant or a DCI. Both of the two TPMIs can each be 6 bits as shown in Table 1-2. To indicate the mapping between PUSCH occasions and SRS resource sets based on TPMI, one or more dedicated/reserved entries (e.g., first value in TPMI0) in TPMI0 can be used/repurposed to indicate that all scheduling PUSCH occasions correspond to SRS resource set 1 (single TRP transmission towards/from TRP1), the second set of power control parameters, or the second configuration of codebook subset. Furthermore, one or more dedicated/reserved entries in TPMI1 (e.g., second value in TPMI1) can be used/repurposed to indicate that all scheduling PUSCH occasions correspond to SRS resource set 0 (e.g., single TRP transmission towards/from TRP0), the first set of power control parameters, or the first configuration of codebook subset. In the case when the dedicated entry or entries are not indicated either by TPMI0 or TPMI1, the scheduling PUSCH occasions may be divided into two sets which correspond to SRS resource set 0 and set 1 respectively (e.g., MTRP transmission towards/from two TRPs). In some embodiments, the third value in TPMI0 or TPMI1 may not be equal to first value or second value. Third value in TPMI 0 and TPMI1 can be different or same.

For instance, the last entry (entry value 63) in TPMI0 may be the dedicated/reserved/repurposed entry which is used to indicate that all PUSCH occasions correspond to SRS resource set 1 and TRP1, and TPMI1, or to disable transmission towards/from TRP0. The precoder information and number of layers for all PUSCH occasions may be provided by TPMI1. Meanwhile, the last entry (entry value 63) in TPMI1 may be the dedicated/reserved/repurposed entry which is used to indicate that all PUSCH occasions correspond to SRS resource set 0 and TRP0 and TPMI0, or to disable transmission towards/from TRP1. The precoder information and number of layers for all PUSCH occasions may be provided by TPMI0.

Thus, if TPMI0 indicates value 63 (e.g., first value), and TPMI1 does not indicate value 63 (e.g., second value) (for example, TPMI0 indicates value 1 (third value in TPMI0), and TPMI1 indicates value 2 (third value in TPMI1)), all PUSCH occasions may correspond to SRS resource set 1, the precoder information and the number of layers of all scheduled/scheduling PUSCH occasions may be indicated/identifier/specified by TPMI1. If TPMI1 indicates value 63, and TPMI0 does not indicate value 63, all PUSCH occasions may correspond to SRS resource set 0, the precoder information and the number of layers of all scheduled PUSCH occasions may be indicated/identifier/specified by TPMI0.

If neither TPMI0 nor TPMI1 indicates value 63 or any of the dedicated/reserved/repurposed values, the first set of PUSCH occasions may correspond to SRS resource set 0 and/or the first set of power control parameters. Furthermore, the second set of PUSCH occasions may correspond to SRS resource set 1 and/or the second set of power control parameters.

The precoder information and the number of layers of the first set of scheduled PUSCH occasions may be indicated/specified by TPMI0. The precoder information of the second set of scheduled PUSCH occasions may be indicated/specified by TPMI1.

TABLE 1-2

Illustration of TPMI entries for TPMI0 (or TPMI1)

| Bit field mapped to index | codebookSubset = fullyAndPartialAndNonCoherent |
|---|---|
| 0 | 1 layer: TPMI = 0 |
| 1 | 1 layer: TPMI = 1 |
| . . . | . . . |
| 3 | 1 layer: TPMI = 3 |
| 4 | 2 layers: TPMI = 0 |
| . . . | . . . |
| 9 | 2 layers: TPMI = 5 |
| 10 | 3 layers: TPMI = 0 |
| 11 | 4 layers: TPMI = 0 |
| 12 | 1 layer: TPMI = 4 |
| . . . | . . . |
| 19 | 1 layer: TPMI = 11 |
| 20 | 2 layers: TPMI = 6 |
| . . . | . . . |
| 27 | 2 layers: TPMI = 13 |
| 28 | 3 layers: TPMI = 1 |
| 29 | 3 layers: TPMI = 2 |
| 30 | 4 layers: TPMI = 1 |
| 31 | 4 layers: TPMI = 2 |
| 32 | 1 layers: TPMI = 12 |
| . . . | . . . |
| 47 | 1 layers: TPMI = 27 |
| 48 | 2 layers: TPMI = 14 |
| . . . | . . . |
| 55 | 2 layers: TPMI = 21 |
| 56 | 3 layers: TPMI = 3 |
| . . . | . . . |
| 59 | 3 layers: TPMI = 6 |
| 60 | 4 layers: TPMI = 3 |
| 61 | 4 layers: TPMI = 4 |
| 62 | reserved |
| 63 | reserved |

II. Using TPMI Entries for Mapping

To reduce UE complexity, the number of layers can be the same for all PUSCH occasions. In such a case, the number of layers can be indicated by TPMI0. Thus, TPMI0 may be used to indicate both the precoder information and number of layers. If the number of layers indicated by TPMI0 is r, Xbits of TPMI1 may only be used to indicate precoder information rather than both precoder information and number of layers. Since r is indicated by TPMI0 and can be changed dynamically, but DCI size cannot be changed dynamically considering feasible UE implementation, Xbits may be not be changed dynamically. That is, a RRC-configured or predefined Xbits may be reserved in a DCI or scheduling grant to indicate that the precoder information for the number layer r wherein r may be variable. Therefore, X bits may be able to indicate the precoder information for the variable number of layers r. In other words, Xbits may correspond to (and/or be configured according to) the maximum number of required bits among possible value r. For example, the numbers of precoders for 1 layer, 2 layers, 3 layers and 4 layers are 28, 22, 7, and 5 respectively. One layer may have a maximum number of precoders which is to be log 2(28)=5 bits. Thus, X may be 5 as shown in Table 1-3.

TABLE 1-3

Illustration of TPMI1 Entries

| Bit field mapped to index | TPMI1 for rank1 | TPMI1 for rank2 | TPMI1 for rank3 | TPMI1 for rank4 |
|---|---|---|---|---|
| 0 | 1 layer: TPMI = 0 | 2 layers: TPMI = 0 | 3 layers: TPMI = 0 | 4 layers: TPMI = 0 |
| 1 | 1 layer: TPMI = 1 | 2 layers: TPMI = 1 | 3 layers: TPMI = 1 | 4 layers: TPMI = 1 |
| . . . | . . . | . . . | . . . | . . . |
| 4 | . . . | . . . | . . . | 4 layers: TPMI = 4 |
| 5 | . . . | . . . | . . . | reserved |
| 6 | . . . | . . . | 3 layers: TPMI = 6 | reserved |
| . . . | . . . | . . . | reserved | reserved |
| 21 | . . . | 2 layers: TPMI = 21 | reserved | reserved |
| . . . | | reserved | reserved | reserved |
| 27 | 1 layers: TPMI = 27 | reserved | reserved | reserved |
| 28 | reserved | reserved | reserved | reserved |
| 29 | reserved | reserved | reserved | reserved |
| 30 | reserved | reserved | reserved | reserved |
| 31 | reserved | reserved | reserved | reserved |

Still, taking a UE configured full coherent codebook (codebookSubset=fulllyAndPartialAndNonCoherent) as an example, the TPMI0 may rely on 6 bits to indicate precoder information and number of layers r as shown in Table 1-2. Since the number of layers are the same for all PUSCH occasions, the TPMI1 can be used to indicate the precoder information, rather than both the precoder information and number of layers.

One enhanced embodiment can be to indicate the mapping between PUSCH occasions and SRS resource sets based on TPMI1. Specifically, the first set of dedicated entries (e.g., first value in second TPMI) in TPMI1 can be used to indicate all scheduling PUSCH occasions corresponding to SRS resource set 0 (single TRP transmission towards/from TRP0) and/or the first set of power control parameters or a first configuration of codebook subset. The number of layers and precoders information of all PUSCH occasions may be indicated by TPMI0 for instance. If more than one (e.g., two SRS resources) are configured in a SRS resource set 0 for codebook-based transmission, the corresponding SRI field (e.g., SRI0 or SRI1) may be included in DCI. Thus, the corresponding SRI may be used to further select the SRS resource(s) within the corresponding resource set 0. In consequence, all scheduling PUSCH occasions (e.g., transmission occasions for scheduling the PUSCH transmissions) may correspond to the selected SRS resource within the SRS resource set 0 and/or the selected subset of power control parameters (e.g., SRI0 may be used to select one subset from the first set of power control parameters).

Furthermore, the second set of dedicated entries (e.g., second value in the second TPMI) in TPMI1 can be used to indicate that all scheduling PUSCH occasions correspond to SRS resource set 1 (e.g., single TRP transmission towards/from TRP1), the second set of power control parameters, or a second configuration of codebook subset. The number of layers and precoders information of all PUSCH occasions may be indicated by TPMI0. If more than one (e.g., two SRS resources) are configured in a SRS resource set 1 for codebook, the corresponding SRI field (e.g. SRI1 or SRI0) may be included in the DCI. Thus, the corresponding SRI may be used to further select the SRS resource within the corresponding resource set 1. In consequence, all scheduling PUSCH occasions may correspond to the selected SRS resource within the SRS resource set 1, or the selected subset of power control parameters (e.g., SRI1 may be used to select one subset from the second set of power control parameters).

The third set of entries (e.g., third value in the second TPMI) in TPMI1 can be used to indicate MTRP transmission. The first set of PUSCH occasions may correspond to SRS resource set 0, and the second set of PUSCH occasions may correspond to SRS resource set 1. The number of layers of all PUSCH occasions may be indicated by TPMI0. The precoder information of the first set and the second set of PUSCH occasions may be indicated by TPMI0 and TPMI1 respectively. The third set of entries may be not the dedicated entries, and may be used to indicate precoder information of the second set of PUSCH occasions. In other words, the third set of entries may be the entries other than ones in first and/or second set of entries, and may not be reserved entries. In such case, TPMI 0 may not indicate a reserved value.

If more than one (e.g. two SRS resource) are configured in a SRS resource set 0 or 1 for codebook, the corresponding SRI field (e.g. SRI0 or SRI1) may be used in DCI. Thus, the corresponding SRI may be used to further select/identify the SRS resource(s) within the corresponding resource set 0 and set 1. In consequence, the first set of PUSCH occasions may correspond to the SRS resource(s) selected by SRI0 (or SRI1) within SRS resource set 0, and the second set of PUSCH occasions may correspond to the SRS resource(s) selected by SRI1 (or SRI0) within SRS resource set 1. In such case, the first set of PUSCH occasions may correspond to the selected subset from the first set of power control parameters. The subset may be selected/indicated by/using SRI0 (or SRI1). The second set of PUSCH occasions may correspond to the selected subset from the second set of power control parameters. The subset may be selected/indicated by/using SRI1 (or SRI0).

Specifically, as shown in Table 1-4, the first set of dedicated entries in TPMI1 may contain or correspond to the second last entry/row (entry 30), the second set of dedicated entries in TPMI1 may contain or correspond to the last entry/row (entry 31). The third set of entries (italicized) in TPMI1 may be the remaining entries not belonging to reserved entries.

TABLE 1-4

| Illustration of TPMI1 entries to the mapping | | | | |
|---|---|---|---|---|
| Bit field mapped to index | TPMI1 for rank1 | TPMI1 for rank2 | TPMI1 for rank3 | TPMI1 for rank4 |
| 0 | 1 layer: TPMI = 0 | 2 layers: TPMI = 0 | 3 layers: TPMI = 0 | 4 layers: TPMI = 0 |
| 1 | . . . | . . . | . . . | . . . |
| . . . | . . . | . . . | . . . | . . . |
| 4 | . . . | | | 4 layers: TPMI = 4 |
| 5 | . . . | | | |
| 6 | . . . | | 3 layers: TPMI = 6 | |
| . . . | . . . | | | |
| 21 | . . . | 2 layers: TPMI = 21 | | |
| . . . | | | | |
| 27 | 1 layers: TPMI = 27 | | | |
| 28 | | | | |
| 29 | | | | |
| 30 | TRP0 | TRP0 | TRP0 | TRP0 |
| 31 | TRP1 | TRP1 | TRP1 | TRP1 |

In some embodiments, the first set of dedicated entries in TPMI1 may contain or correspond to the last entry/row, and the second set of dedicated entries in TPMI1 may contain or correspond to the second last entry/row.

In the above description, all PUSCH occasions may be scheduled by one scheduling grant. The UE may determine the precoder of each PUSCH transmission occasion based on the corresponding SRI (or SRS resource(s)) and corresponding TPMI.

Figure 5:
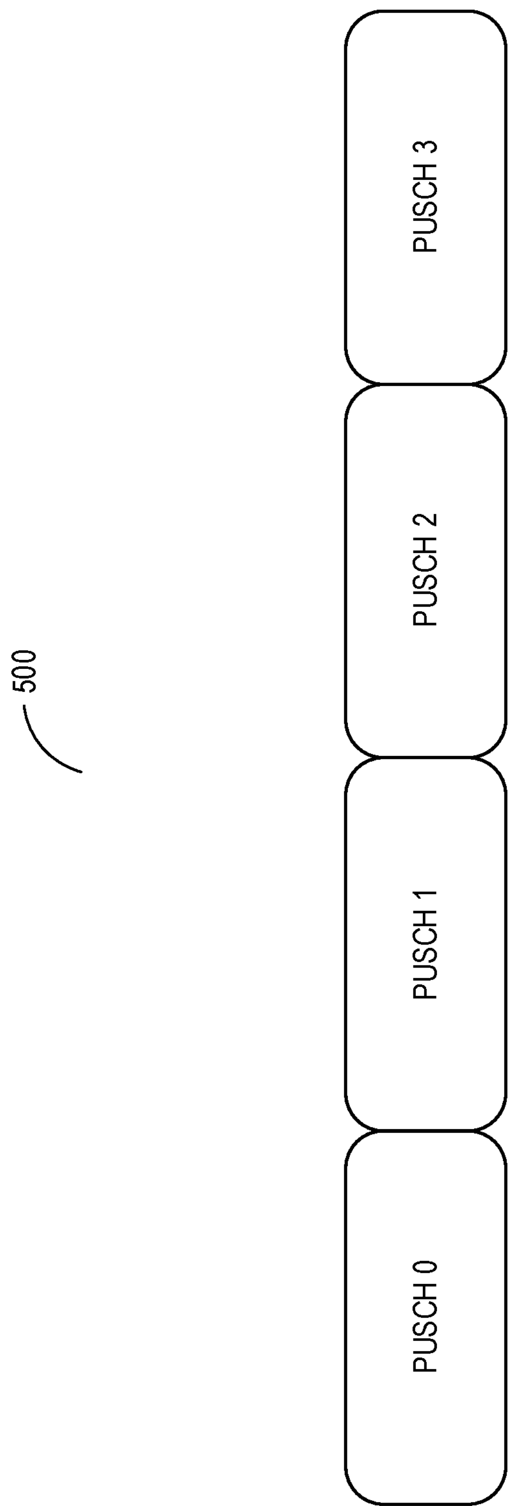
FIG. 5 illustrates a block diagram of multiple physical uplink shared control (PUSCH) occasions in accordance with an illustrative embodiment.

Referring now to FIG. 5, depicted is a block diagram of a multiple physical uplink shared control (PUSCH) occasions 500. For MTRP transmission, all PUSCH occasions may be divided into multiple groups or sets. Moreover, all PUSCH occasions may be multiplexed in different time units (e.g., multiplexed in TDMed manner). For instance, all PUSCH occasions may be divided into two groups or sets. The first set may correspond to even (or odd) PUSCH occasions, and the second set may correspond to odd (or even) PUSCH occasions. As shown, PUSCH occasion 0 and 2 may belong to the first set, PUSCH occasion 1 and 3 may belong to the second set, and vice-versa.

In some embodiments, the first set may correspond to the first and the second PUSCH occasions, the second set may correspond to third and the fourth PUSCH occasions. Further, the first set may also contain the fifth and the sixth PUSCH occasions if any, the second set may also contain the seventh and the eighth PUSCH occasions if any, and the same cycling/recurring mapping may be used for all remaining PUSCH occasions. In some embodiments, the first set may contain the first half of the PUSCH occasions, the second set may contain the second half of the PUSCH occasions.

Figure 6:
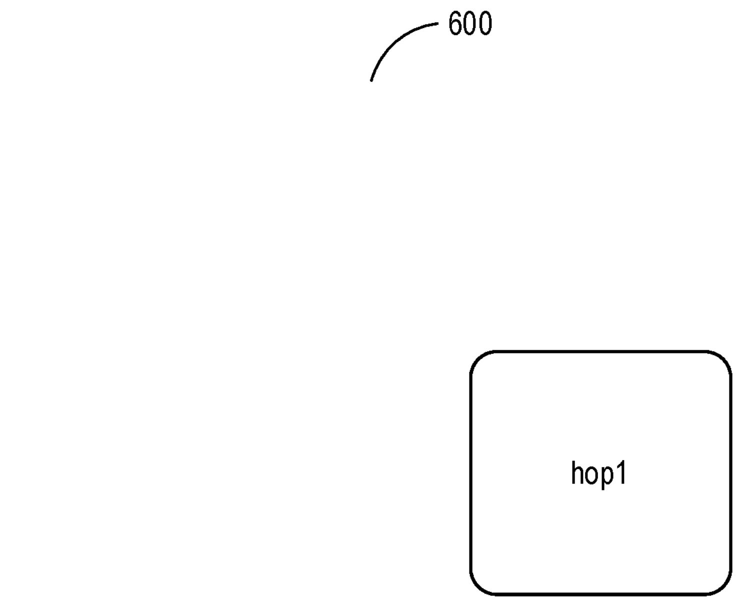
FIG. 6 illustrates a block diagram of a single physical uplink shared control (PUSCH) occasion in accordance with an illustrative embodiment.
Figure 6:
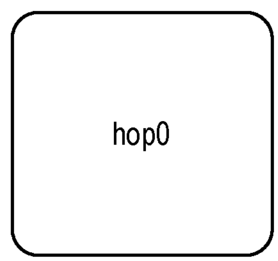

Referring now to FIG. 6, depicted is a block diagram of a single uplink shared control (PUSCH) occasion 600. The first and the second set of PUSCH occasions can correspond to different PUSCH frequency hops. As shown, the first and the second set of PUSCH occasions can respectively correspond to frequency hop0 and 1 of one PUSCH occasion.

In the above description, if a SRS resource set used for codebook based transmission only contains one SRS resource, the corresponding SRI field in DCI may not be needed or relied upon. If more than one, (e.g., two SRS resources) are configured in a SRS resource set for codebook, the corresponding SRI field may be retained/used in the DCI. Thus, TPMI may be used to indicate the mapping between PUSCH occasions or frequency hops and SRS resource set, and/or a set of power control parameters, as discussed above. Then, the corresponding SRI may be used to further select the SRS resource(s) within the corresponding resource set for corresponding PUSCH occasions or frequency hops, and/or to further select the subset within the corresponding set of power control parameters.

C. Using Downlink Control Information for Dynamic Switching

In some embodiments, supporting dynamic switching between single-TRP and MTRP PUSCH transmissions may be based on DCI formats or RNTI of a DCI. Specifically, a DCI format with CRC scrambled by RNTI A may be used for single-TRP PUSCH transmission, and another DCI with CRC scrambled by RNTI B may be used for MTRP PUSCH transmission. For a first DCI with CRC scrambled by RNTI A, all scheduled PUSCH occasions may correspond to SRS resource set 0 or set 1. For a second DCI with CRC scrambled by RNTI B, all scheduled PUSCH occasions may be divided into two sets/groups, where the first set may correspond to SRS resource set 0, and the second set may correspond to SRS resource set 1. In such a case, two SRI fields and two TPMI fields may be retained/configured/used in the second DCI. RNTI A and RNTI B may be different or separate.

In some embodiments, for a first DCI with DCI format A, all scheduled PUSCH occasions may correspond to SRS resource set 0 or set 1 (single TRP). For a second DCI with DCI format B, all scheduled PUSCH occasions may be divided into two sets or groups, where the first set may correspond to SRS resource set 0 and the second set may correspond to SRS resource set 1. In such a case, two SRI fields and two TPMI fields may be included/used/configured/retained in the second DCI. DCI format A and format B may be different.

Figure 7:
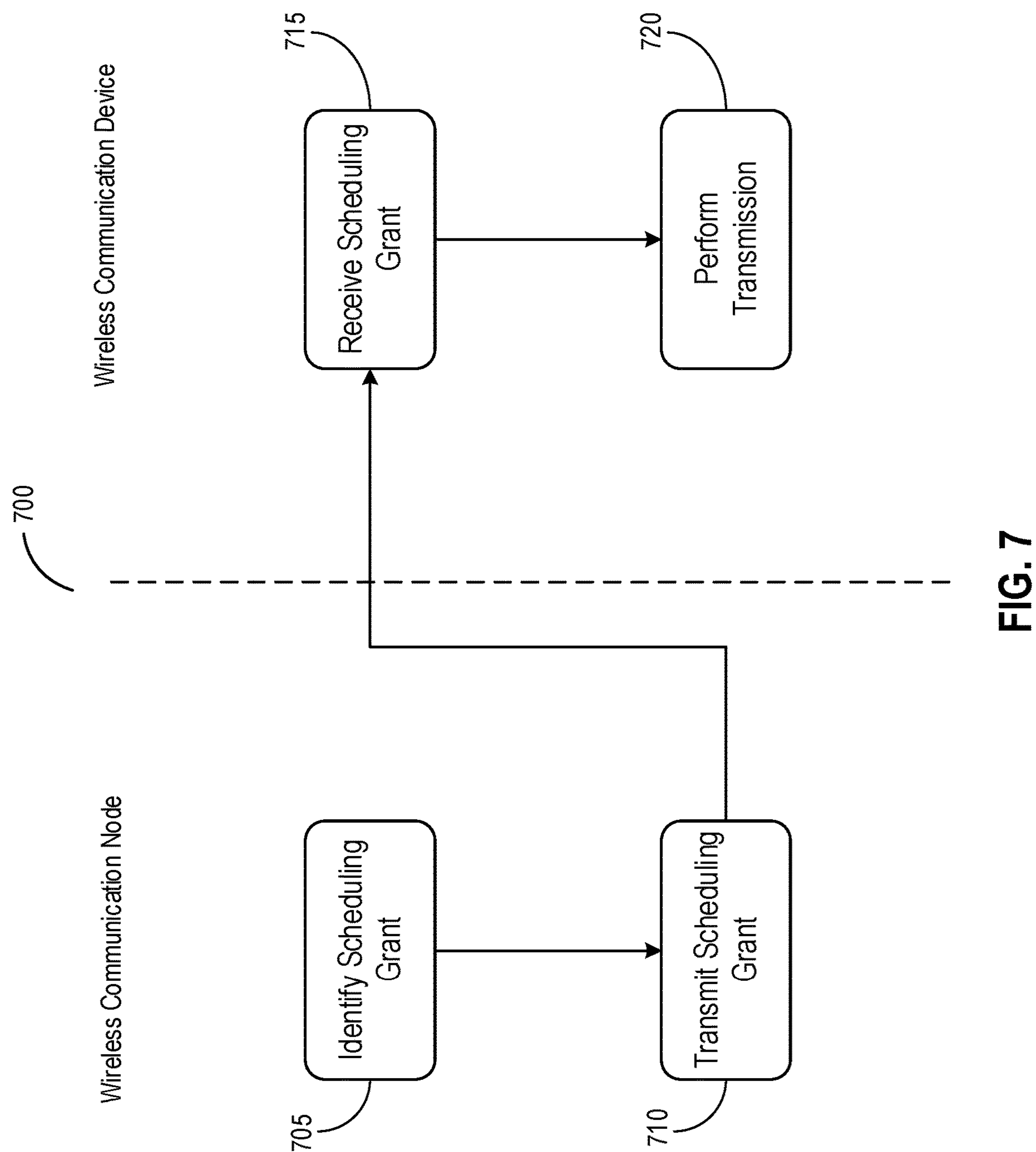
FIG. 7 illustrates a flow diagram of a method of multiple transmission reception point (TRP) transmitting/receiving signaling in accordance with an illustrative embodiment.

D. Process for Multiple Transmission Reception Point (TRP) Transmitting Signaling Referring now to FIG. 7, depicted is a flow diagram of a method 700 of multiple transmission reception point (TRP) signaling. The method 700 may be implemented by or performed using any of the components discussed above, such as the BS 102, UE 104, BS 202, or UE 204, among others. In brief overview, a wireless communication node may identify a scheduling grant (705). The wireless communication node may transmit the scheduling grant (710).

The wireless communication device may receive the scheduling grant (715). The wireless communication device may perform a transmission (720).

In further detail, a wireless communication node (e.g., the BS 102 or BS 202) may retrieve, obtain, or otherwise identify a scheduling grant (705). The scheduling grant may define, specify, or otherwise identify a set of transmission instances. Each transmission instance may correspond to or include a transmission occasion (e.g., in a time and/or frequency unit) or a frequency hop. In some embodiments, each transmission instance may be for an uplink communication, such a physical uplink shared channel (PUSCH) and a physical uplink control channel (PUCCH), among others. In some embodiments, each transmission instance may be for a downlink communication, such as a physical downlink shared channel (PDSCH) or a physical downlink control channel (PDCCH), among others. In some embodiments, the wireless communication node may determine or generate the scheduling grant for one or more wireless communication devices (e.g., UE 104 or UE 204) in communication with the wireless communication node.

In general, the scheduling grant may define, identify, or include a set of transmission precoding matrix indicators (TPMIs). The set of TPMIs may specify, define, or otherwise indicate mappings between the set of transmission instances and a set of sounding reference signal (SRS) resource sets for codebook-based transmissions. The SRS resource sets may define or identify an allocation of time and frequency domain for the SRS transmission(s). In some embodiments, the TPMIs may identify or include a first TPMI and a second TPMI, among others. The identification of each TPMI may be via a corresponding field in the scheduling grant. The set of SRS resource sets may identify or include a first SRS resource set and a second SRS resource set, among others. The identification of each SRS resource may be via a corresponding field in the scheduling grant.

The values of the TPMIs may define, identify, or indicate that the set of transmission instances is mapped (or correspond) to one or more of the SRS resource sets, power control parameters, and/or a configuration of a codebook subset. The power control parameters may define or identify various power control values (e.g., P0 and alpha) for a communication channel (e.g., PUSCH, PUCCH, PDSCH, and PDCCH) between the wireless communication node and the wireless communication device. The configuration of the codebook subset may define or identify one or more values in the codebook matrix to be restricted, enhanced, or otherwise modified for the communication channel between the wireless communication node and the wireless communication device. The codebook subset may be configured with 'fullyAndPartialAndNonCoherent', or 'partialAndNonCoherent', or 'nonCoherent' depending on the UE capability.

In some embodiments, the entries in the scheduling grant (e.g., Tables 1-2 and 1-3) as defined may define/indicate/specify the mapping between transmission instances and the SRS resource sets using the last or largest value entry of the TPMI. In some embodiments, a first value of the first TPMI (e.g., TPMI0) may define, identify, or indicate that the set of transmission instances is mapped to at least one SRS resource of the second SRS resource (e.g., in association with TRP1). In some embodiments, the first value of the first TPMI may indicate that the set of transmission instances is mapped to at least a portion of a second set of power control parameters (e.g., in association with TRP1). In some embodiments, the first value of the first TPMI may indicate that the set of transmission instances is mapped to a second configuration of codebook subset (e.g., in association with TRP1). The first value of the first TPMI may correspond to a dedicated or reserved entry of TPMI0. In some embodiments, at least the first value may correspond to or may be a last or largest value of the first TPMI.

In some embodiments, a second value of the second TPMI may define, identify, or indicate that the set of transmission instances is mapped (or correspond) to at least one SRS resource set of the first SRS resource set (e.g., in association with TRP0). In some embodiments, a second value of the second TPMI may define, identify, or indicate at least a portion of a first set of power control parameters (e.g., in association with TRP0). In some embodiments, a second value of the second TPMI may define, identify, or indicate a first configuration of codebook subset (e.g., in association with TRP0). The second value of the second TPMI may correspond to a dedicated or reserved entry of TPMI1. In some embodiments, at least the second value may correspond to or may be a last or largest value of the second TPMI.

In some embodiments, a third value (e.g., other than the first value and the second value) may define, identify, or indicate that a first subset and a second subset of transmission instances are respectively mapped to at least one SRS resource of the first SRS resource set (e.g., in association with TRP0) and to at least one SRS resource of the second SRS resource set (e.g., in association with TRP1). In some embodiments, the third value may define, identify, or indicate that the first subset and the second subset of transmission instances are respectively mapped to at least a portion of the first set of power control parameters (e.g., in association with TRP0) and the second set of power control parameters (e.g., in association with TRP1). In some embodiments, the third value may define, identify, or indicate that the first subset and the second subset of transmission instances are respectively mapped to the first set of power control parameters (e.g., in association with TRP0) and the second set of power control parameters (e.g., in association with TRP1). In some embodiments, the third value may define, identify, or indicate that the first subset and the second subset of transmission instances are respectively mapped to the first configuration of codebook subset (e.g., in association with TRP0) and the second configuration of codebook subset (e.g., in association with TRP1).

In some embodiments, the entries in the scheduling grant (e.g., as defined in Tables 1-3 and 1-4) may include number of layers indicated by one of the TPMI entries (e.g., TPMI0) and the mapping between transmission instances and SRS resource sets using another TPMI entry (e.g., TPMI1). In some embodiments, the first TPMI may identify or indicate a number of layers and precoder information of the set of transmission instances. The number of layers may be for the number of transmission layers to be used for the communications between the wireless communication node and the wireless communication device. The precoder information may specify or define transmission characteristics to be used in the communications between the wireless communication node and the wireless communication device. In some embodiments, the second TPMI may at least indicate a mapping between the set of transmission instances and the first SRS resource set. In some embodiments, the second TPMI may at least indicate a mapping between the set of transmission instances and the second SRS resource set.

In some embodiments, a first value of the second TPMI may indicate that the set of transmissions instances is mapped to at least one SRS resource of the first SRS resource set. In some embodiments, the first value of the second TPMI may indicate that the set of transmissions instances is mapped to at least a portion of the first set of power control parameters. In some embodiments, the first value of the second TPMI may indicate that the set of transmissions instances is mapped to the first set of power control parameters. In some embodiments, the first value of the second TPMI may indicate that the set of transmissions instances is mapped to a first configuration of codebook subset. In some embodiments, the first value of the second TPMI may be a next to last or next to largest value of the second TPMI. In some embodiments, the first value of the second TPMI may be the last or largest value of the second TPMI.

In some embodiments, a second value of the second TPMI may indicate that the set of transmissions instances is mapped to at least one SRS resource of the second SRS resource set. In some embodiments, the second value of the second TPMI may indicate that the set of transmissions instances is mapped to at least a portion of the second set of power control parameters. In some embodiments, the second value of the second TPMI may indicate that the set of transmissions instances is mapped to the second set of power control parameters. In some embodiments, the second value of the second TPMI may indicate that the set of transmissions instances is mapped to a second configuration of codebook subset. In some embodiments, the second value of the second TPMI may be a last or largest value of the second TPMI, and the first value may be the next to last or next to the largest value. In some embodiments, the second value of the second TPMI may be the next to last or next to the largest value of the second TPMI, and the first value may be the last or the largest value.

In some embodiments, at least a third value of the second TPMI (e.g., other than the first value and the second value) may define, identify, or indicate that a first subset and a second subset of the plurality of transmission instances are respectively mapped to one SRS resource of the first SRS resource set and one SRS resource of the second SRS resource set. In some embodiments, the third value of the second TPMI may define, identify, or indicate that a first subset and a second subset of the plurality of transmission instances are respectively mapped to a subset of the first set and a subset of the second set of power control parameters. In some embodiments, the third value of the second TPMI may define, identify, or indicate that a first subset and a second subset of the plurality of transmission instances are respectively mapped to the first set and the second set of power control parameters. In some embodiments, the third value of the second TPMI may define, identify, or indicate that a first subset and a second subset of the plurality of transmission instances are respectively mapped to the first configuration of codebook subset and the second configuration of codebook subset.

In some embodiments, a value of the SRS resource indicator (SRI) in the scheduling grant may identify at least one SRS resource set or at least a portion of a set of power control parameters. In some embodiments, at least one SRS resource of the first SRS resource set or at least the portion of the first set of power control parameters may be identified or indicated by a first SRI in the scheduling grant. In some embodiments, at least one SRS resource of the second SRS resource set or at least the portion of the second set of power control parameters may be identified or indicated by a second SRI in the scheduling grant.

The wireless communication node may send, provide, or otherwise transmit the scheduling grant to a wireless communication device (e.g., UE 104 or UE 204) (710). The transmission of the scheduling grant may be to trigger a communication (e.g., uplink or downlink communication) in accordance with the set of transmission instances by the wireless communication device. In some embodiments, the wireless communication node may transmit the scheduling grant to the wireless communication upon identification or generation of the scheduling grant. In some embodiments, the wireless communication node may transmit the scheduling grant in downlink control information (DCI) or a configured grant signal for uplink/downlink transmissions. The wireless communication device may retrieve, identify, or otherwise receive the scheduling grant from the wireless communication node (715). In some embodiments, the wireless communication device may receive the scheduling grant in DCI or the configured grant signal for uplink/downlink transmissions.

The wireless communication device may carry out or otherwise perform a transmission in accordance with the scheduling grant (720). In response to receipt of the scheduling grant, the wireless communication device may perform the transmission according to the scheduling of the set of transmission instances as identified in the scheduling grant. The wireless communication device may parse the scheduling grant to extract or identify the set of TPMIs. With the identification, the wireless communication device may transmit a communication (e.g., PUCCH or PUSCH) to the wireless communication node using the SRS resource set, the power control parameters, or the configuration of codebook subset specified in the scheduling grant.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

transmitting, by a wireless communication node, to a wireless communication device, a scheduling grant to schedule a plurality of transmission instances, wherein the scheduling grant includes a first sounding reference signal (SRS) resource indicator (SRI), and a second SRI, wherein the first SRI indicates at least a portion of a first set of power control parameters, wherein the second SRI indicates at least a portion of a second set of power control parameters, wherein the scheduling grant includes one or more transmission precoding matrix indicators (TPMIs) to dynamically indicate mappings between the plurality of transmission instances and a plurality of SRS resource sets for uplink codebook based transmissions and the one or more TPMIs include a first TPMI and a second TPMI, and the plurality of SRS resource sets includes a first SRS resource set and a second SRS resource set, and wherein at least one of:

at least a first value of the first TPMI indicates that the plurality of transmission instances is mapped to at least one of: one SRS resource of the second SRS resource set, at least a portion of the second set of power control parameters, or a second configuration of codebook subset, at least a second value of the second TPMI indicates that the plurality of transmission instances is mapped to at least one of: one SRS resource of the first SRS resource set, at least a portion of the first set of power control parameters, or a first configuration of codebook subset, or at least a third value, other than the at least the first value and the at least the second value, indicates that a first subset and a second subset of the plurality of transmission instances are respectively mapped to one SRS resource of the first SRS resource set and one SRS resource of the second SRS resource set, or respectively mapped to at least a portion of the first set of power control parameters and at least a portion of the second set of power control parameters, or respectively mapped to the first configuration of codebook subset and the second configuration of codebook subset.

2. The method of claim 1, wherein at least one of:

the at least the first value is a last or largest value of the first TPMI, or the at least the second value is a last or largest value of the second TPMI.

3. The method of claim 1, wherein the one or more TPMIs include a first TPMI and a second TPMI, and the plurality of SRS resource sets includes a first SRS resource set and a second SRS resource set, and wherein the second TPMI at least indicates a mapping between the plurality of transmission instances and at least one of: the first SRS resource set or the second SRS resource set.

4. The method of claim 3, wherein at least one of:

a first value of the second TPMI indicates that the plurality of transmission instances is mapped to at least one of: one SRS resource of the first SRS resource set, at least a portion of the first set of power control parameters, or a first configuration of codebook subset, or a second value of the second TPMI indicates that the plurality of transmission instances is mapped to at least one of: one SRS resource of the second SRS resource set, at least a portion of the second set of power control parameters, or a second configuration of codebook subset.

5. The method of claim 4, wherein the first TPMI indicates a number of layers and precoder information of the plurality of transmission instances.

6. The method of claim 4, wherein the first value of the second TPMI is a next to last or next to largest value of the second TPMI, and the second value of the second TPMI is a last or largest value of the second TPMI.

7. The method of claim 4, wherein the first value of the second TPMI is a last or largest value of the second TPMI, and the second value of the second TPMI is a next last or next to largest value of the second TPMI.

8. The method of claim 4, wherein at least a third value of the second TPMI, other than the at least the first value and the at least the second value of the second TPMI, indicates that a first subset and a second subset of the plurality of transmission instances are respectively mapped to one SRS resource of the first SRS resource set and one SRS resource of the second SRS resource set, or respectively mapped to at least a portion of the first set and at least a portion of the second set of power control parameters, or respectively mapped to the first configuration of codebook subset and the second configuration of codebook subset.

9. The method of claim 1, wherein:

the one SRS resource of the first SRS resource set is indicated by the first SRI in the scheduling grant, and the one SRS resource of the second SRS resource set is indicated by the second SRI in the scheduling grant.

10. The method of claim 1, wherein:

each of the plurality of transmission instances comprises one transmission occasion or one frequency hop.

11. A method comprising:

receiving, by a wireless communication device from a wireless communication node, a scheduling grant to schedule a plurality of transmission instances, wherein the scheduling grant includes a first sounding reference signal (SRS) resource indicator (SRI), and a second SRI, wherein the first SRI indicates at least a portion of a first set of power control parameters, wherein the second SRI indicates at least a portion of a second set of power control parameters, wherein the scheduling grant includes one or more transmission precoding matrix indicators (TPMIs) to dynamically indicate mappings between the plurality of transmission instances and a plurality of SRS resource sets for uplink codebook based transmissions and the one or more TPMIs include a first TPMI and a second TPMI, and the plurality of SRS resource sets includes a first SRS resource set and a second SRS resource set, and wherein at least one of:

at least a first value of the first TPMI indicates that the plurality of transmission instances is mapped to at least one of: one SRS resource of the second SRS resource set, at least a portion of the second set of power control parameters, or a second configuration of codebook subset, at least a second value of the second TPMI indicates that the plurality of transmission instances is mapped to at least one of: one SRS resource of the first SRS resource set, at least a portion of the first set of power control parameters, or a first configuration of codebook subset, or at least a third value, other than the at least the first value and the at least the second value, indicates that a first subset and a second subset of the plurality of transmission instances are respectively mapped to one SRS resource of the first SRS resource set and one SRS resource of the second SRS resource set, or respectively mapped to at least a portion of the first set of power control parameters and at least a portion of the second set of power control parameters, or respectively mapped to the first configuration of codebook subset and the second configuration of codebook subset.

12. The method of claim 11, wherein at least one of:

the at least the first value is a last or largest value of the first TPMI, or the at least the second value is a last or largest value of the second TPMI.

13. The method of claim 12, wherein the one or more TPMIs include a first TPMI and a second TPMI, and the plurality of SRS resource sets includes a first SRS resource set and a second SRS resource set, and wherein the second TPMI at least indicates a mapping between the plurality of transmission instances and at least one of: the first SRS resource set or the second SRS resource set.

14. The method of claim 13, wherein at least one of:

a first value of the second TPMI indicates that the plurality of transmission instances is mapped to at least one of: one SRS resource of the first SRS resource set, at least a portion of the first set of power control parameters, or a first configuration of codebook subset, or a second value of the second TPMI indicates that the plurality of transmission instances is mapped to at least one of: one SRS resource of the second SRS resource set, at least a portion of the second set of power control parameters, or a second configuration of codebook subset.

15. The method of claim 14, wherein the first TPMI indicates a number of layers and precoder information of the plurality of transmission instances.

16. The method of claim 14, wherein the first value of the second TPMI is a next to last or next to largest value of the second TPMI, and the second value of the second TPMI is a last or largest value of the second TPMI.

17. A wireless communication node comprising:

at least one processor configured to:

transmit, via a transmitter, to a wireless communication device, a scheduling grant to schedule a plurality of transmission instances, wherein the scheduling grant includes a first sounding reference signal (SRS) resource indicator (SRI), and a second SRI, wherein the first SRI indicates at least a portion of a first set of power control parameters, wherein the second SRI indicates at least a portion of a second set of power control parameters, wherein the scheduling grant includes one or more transmission precoding matrix indicators (TPMIs) to dynamically indicate mappings between the plurality of transmission instances and a plurality of SRS resource sets for uplink codebook based transmissions and the one or more TPMIs include a first TPMI and a second TPMI, and the plurality of SRS resource sets includes a first SRS resource set and a second SRS resource set, and wherein at least one of:

at least a first value of the first TPMI indicates that the plurality of transmission instances is mapped to at least one of: one SRS resource of the second SRS resource set, at least a portion of the second set of power control parameters, or a second configuration of codebook subset, at least a second value of the second TPMI indicates that the plurality of transmission instances is mapped to at least one of: one SRS resource of the first SRS resource set, at least a portion of the first set of power control parameters, or a first configuration of codebook subset, or at least a third value, other than the at least the first value and the at least the second value, indicates that a first subset and a second subset of the plurality of transmission instances are respectively mapped to one SRS resource of the first SRS resource set and one SRS resource of the second SRS resource set, or respectively mapped to at least a portion of the first set of power control parameters and at least a portion of the second set of power control parameters, or respectively mapped to the first configuration of codebook subset and the second configuration of codebook subset.

18. A wireless communication device comprising:

at least one processor configured to:

receive, via a receiver from a wireless communication node, a scheduling grant to schedule a plurality of transmission instances, wherein the scheduling grant includes a first sounding reference signal (SRS) resource indicator (SRI), and a second SRI, wherein the first SRI indicates at least a portion of a first set of power control parameters, wherein the second SRI indicates at least a portion of a second set of power control parameters, wherein the scheduling grant includes one or more transmission precoding matrix indicators (TPMIs) to dynamically indicate mappings between the plurality of transmission instances and a plurality of SRS resource sets for uplink codebook based transmissions and the one or more TPMIs include a first TPMI and a second TPMI, and the plurality of SRS resource sets includes a first SRS resource set and a second SRS resource set, and wherein at least one of:

at least a first value of the first TPMI indicates that the plurality of transmission instances is mapped to at least one of: one SRS resource of the second SRS resource set, at least a portion of the second set of power control parameters, or a second configuration of codebook subset, at least a second value of the second TPMI indicates that the plurality of transmission instances is mapped to at least one of: one SRS resource of the first SRS resource set, at least a portion of the first set of power control parameters, or a first configuration of codebook subset, or at least a third value, other than the at least the first value and the at least the second value, indicates that a first subset and a second subset of the plurality of transmission instances are respectively mapped to one SRS resource of the first SRS resource set and one SRS resource of the second SRS resource set, or respectively mapped to at least a portion of the first set of power control parameters and at least a portion of the second set of power control parameters, or respectively mapped to the first configuration of codebook subset and the second configuration of codebook subset.

* * * * *